(No Model.)
H. H. WINES.
LEMON JUICE EXTRACTOR AND GRATER.
No. 587,903. Patented Aug. 10, 1897.
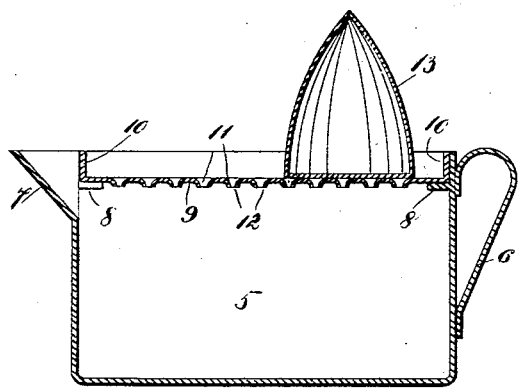
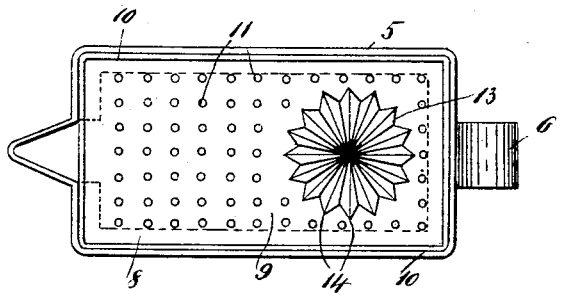
WITNESSES:
INVENTOR
Harriet H. Wines
BY Edgar Tate & Co.
ATTORNEYS.

UNITED STATES PATENT OFFICE.

HARRIET HALSEY WINES, OF WESTHAMPTON BEACH, NEW YORK.

LEMON-JUICE EXTRACTOR AND GRATER.

SPECIFICATION forming part of Letters Patent No. 587,903, dated August 10, 1897.

Application filed May 7, 1897. Serial No. 635,487. (No model.)

*To all whom it may concern:*

Be it known that I, HARRIET HALSEY WINES, a citizen of the United States, residing at Westhampton Beach, in the county of Suffolk and State of New York, have invented certain new and useful Improvements in Lemon-Juice Extractors and Graters, of which the following is a full and complete specification, such as will enable those skilled in the art to which it appertains to make and use the same.

This invention relates to devices for extracting the juice of lemons and other fruit and also for grating the rind thereof; and the object thereof is to provide an improved device of this class which is simple in construction and operation and which is designed to be used as a device for extracting the juice of lemons and other fruit and also as a grater.

The invention is fully disclosed in the following specification, of which the accompanying drawings form a part, in which the separate parts of my improvement are designated by the same numerals of reference in each of the views, and in which—

Figure 1 is a central vertical section of my improvement, and Fig. 2 is a plan view thereof.

In the practice of my invention I provide a pitcher or other vessel 5, which is preferably oblong in form and which is provided at one side with a handle 6 and at the opposite side with a discharge-spout 7, and formed on or secured to the inner walls of the pitcher near the top thereof is an inwardly-directed flange 8, which extends entirely around the pitcher or vessel 5 with the exception of the spout thereof.

It will be apparent that inwardly-directed lugs or projections may be employed instead of the flange 8, if desired, and in the practice of my invention I provide a grater and lemon-juice extractor which comprises a base-plate 9, which is adapted to fit within the upper walls of the pitcher or vessel 5 and to rest on the flange 8 and which is provided around the sides and ends thereof with an upwardly-directed rim 10.

The plate 9 is provided throughout its surface with a plurality of perforations 11, which are stamped therein and by means of which downwardly-directed grating-points 12 are formed; but said perforations 11 may be formed in any desired manner and the bottom of the plate may be provided with downwardly-directed teeth or projections which may be formed thereon in any desired manner, the only object of said teeth or projections being to provide the bottom of the plate 9 with a grating-surface. I also secure to the upper side of the plate 9, preferably at one end thereof, a cone 13 in any desired manner and which is provided with vertical ribs or projections 14, which extend from the base to the top thereof, and the walls of said cone are preferably closed throughout their surface and the bottom thereof is also preferably closed.

The operation will be readily understood from the foregoing description when taken in connection with the accompanying drawings and the following statement thereof.

The plate 9, with the cone 13 secured thereto, is placed in the pitcher or vessel 5, as shown in the drawings, and in practice I divide the lemon or other fruit transversely of its longitudinal axis, and the separate halves thereof are pressed downwardly over the cone 13 by means of the hand and at the same time rotated thereon, pressure being applied thereto, and in this operation the pulp of the lemon will be divided by the ribs 14 of the cone, and the juice thereof will be extracted therefrom and will flow downwardly onto and through the plate 9 into the pitcher or vessel 5.

The bottom of the plate 9 may be used as a grater for the rind of the lemon or other fruit, and any other articles may be grated thereon, as will be readily understood, and it will thus be seen that I accomplish the object of my invention by means of a device which is simple in construction and operation and which is perfectly adapted to accomplish the result for which it is intended.

The plate 9 and the cone 13 may be formed in any desired manner, but in practice I prefer to select material for this purpose which will not corrode or be injuriously affected by fluids or acids.

Having fully described my invention, I claim as new and desire to secure by Letters Patent—

1. In a lemon-juice extractor, a pitcher or other vessel provided with inwardly-directed supports near the top thereof, a perforated plate which is adapted to rest on said supports, and a cone secured to said plate, adjacent to one end thereof, the sides of which are provided with radial ribs or projections, substantially as shown and described.

2. In a lemon-juice extractor, a pitcher or other vessel provided with inwardly-directed supports near the top thereof, a perforated plate which is adapted to rest on said supports, and a cone secured to said plate, the sides of which are provided with radial ribs or projections, the bottom of said plate being adapted to serve as a grater, substantially as shown and described.

3. In a lemon-juice extractor, a pitcher or other vessel provided with inwardly-directed supports near the top thereof, a perforated plate which is adapted to rest on said supports, and a cone secured to said plate, the sides of which are provided with radial ribs or projections, the bottom of said plate being adapted to serve as a grater, and said pitcher or vessel being provided at one side with a handle and at the opposite side with a discharge-spout, substantially as shown and described.

In testimony that I claim the foregoing as my invention I have signed my name, in presence of the subscribing witnesses, this 5th day of May, 1897.

HARRIET HALSEY WINES.

Witnesses:
   USHER B. HOWELL,
   EVERETT B. SWEEZY.